United States Patent
McGovern et al.

(10) Patent No.: US 8,128,344 B2
(45) Date of Patent: Mar. 6, 2012

(54) METHODS AND APPARATUS INVOLVING SHROUD COOLING

(75) Inventors: Kevin Thomas McGovern, Simpsonville, SC (US); Bryan David Lewis, Mauldin, SC (US); Zachary James Taylor, Greenville, SC (US)

(73) Assignee: General Electric Company, Schenectady, NY (US)

( * ) Notice: Subject to any disclaimer, the term of this patent is extended or adjusted under 35 U.S.C. 154(b) by 737 days.

(21) Appl. No.: 12/265,315

(22) Filed: Nov. 5, 2008

(65) Prior Publication Data

US 2010/0111671 A1 May 6, 2010

(51) Int. Cl.
*F04D 31/00* (2006.01)
(52) U.S. Cl. .......................... 415/116; 415/176
(58) Field of Classification Search .............. 415/115, 415/116, 173.1, 176, 178
See application file for complete search history.

(56) References Cited

U.S. PATENT DOCUMENTS

| | | | |
|---|---|---|---|
| 6,224,329 B1 | 5/2001 | North | |
| 6,302,642 B1 | 10/2001 | Nagler et al. | |
| 6,322,320 B1 | 11/2001 | Pfeiffer et al. | |
| 6,361,273 B1 | 3/2002 | Eng et al. | |
| 6,361,274 B1 | 3/2002 | Kreis et al. | |
| 6,406,256 B1 | 6/2002 | Marx | |
| 6,508,623 B1 | 1/2003 | Shiozaki et al. | |
| 6,602,048 B2 | 8/2003 | Fujikawa et al. | |
| 6,726,391 B1 | 4/2004 | Kreis et al. | |
| 7,033,138 B2 | 4/2006 | Tomita et al. | |
| 7,121,790 B2 | 10/2006 | Fokine et al. | |
| 7,131,814 B2 | 11/2006 | Nagler et al. | |
| 7,670,108 B2 * | 3/2010 | Liang | 415/173.1 |
| 2007/0237630 A1 | 10/2007 | Schiavo, Jr. et al. | |

FOREIGN PATENT DOCUMENTS

| | | |
|---|---|---|
| EP | 1245792 A1 | 3/2001 |
| EP | 1256695 A1 | 5/2001 |

* cited by examiner

*Primary Examiner* — Quoc Hoang
(74) *Attorney, Agent, or Firm* — Cantor Colburn LLP

(57) ABSTRACT

A turbine cooling component comprising a circumferential leading edge, a circumferential trailing edge, a pair of spaced and opposed side panels connected to the leading and trailing edges, an arcuate base connected to the trailing and leading edges having a fore portion, a midsection portion, an aft portion, opposed side portions, an outer surface partially defining a cavity operative to receive pressurized air, and an arcuate inner surface in contact with a gas flow path of a turbine engine, a first side cooling air passage in the base extending along the first side portion from the fore portion to the aft portion, and a fore cooling air passage in the fore portion of the base communicative with the side cooling air passage and the cavity, operative to receive the pressurized air from the cavity.

19 Claims, 7 Drawing Sheets

FIG. 7
FIG. 8
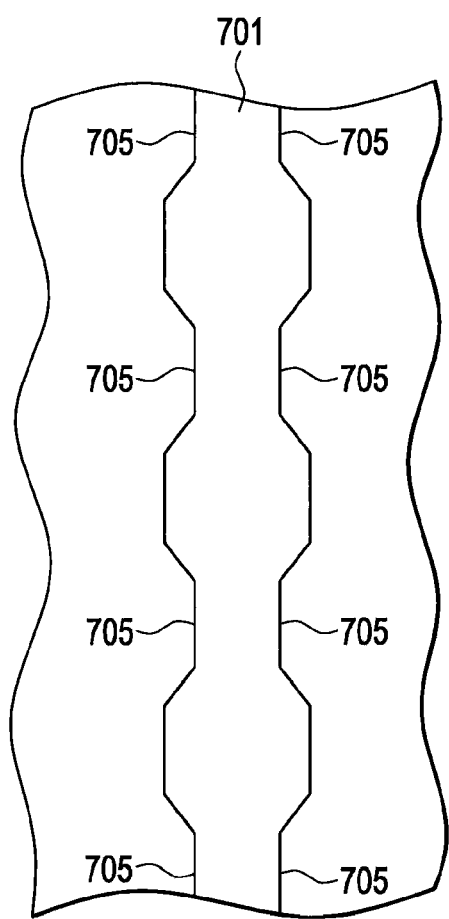
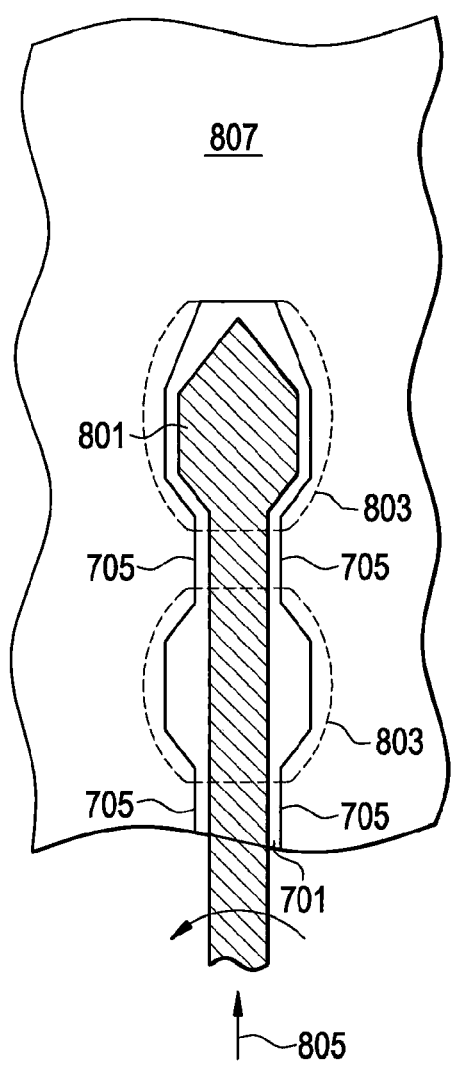

METHODS AND APPARATUS INVOLVING SHROUD COOLING

BACKGROUND OF THE INVENTION

The subject matter disclosed herein relates to turbine engines and particularly to methods and apparatus involving shroud cooling in turbine engines.

The high pressure turbine section of a turbine engine includes rotor blades extending radially from a disk assembly mounted inside a casing. The turbine engine includes a shroud assembly mounted on the circumference of the casing surrounding the rotor blades. The rotor blades and shroud assembly are subjected to a high temperature gas flow that affects the rotation of the rotor blades. The rotor blades include a blade tip at a distal end of a rotor blade. A small gap is defined between the blade tips and the shroud assembly. The small gap is desirable for engine efficiency since gas flow passing through the gap does not efficiently affect the rotation of the rotor blades.

In practice, the shroud assembly often comprises a number of segments mounted to the casing to form a circumferential shroud assembly. The shroud assembly is subjected to high temperatures and the segments are often cooled with flowing pressurized air. The pressurized air contacts a surface of a shroud segment and may pass through internal passages of the shroud segment and into the gas flow path inside the casing. Once the pressurized air has cooled the shroud segment, the pressurized air entering the gas flow path may undesirably affect the gas flow path by changing a direction of flow. Thus, it is desirable to reduce the amount of pressurized air used to cool the shroud segment and to discharge the pressurized air into the gas flow path in a manner that lessens the effects to the gas flow path.

BRIEF DESCRIPTION OF THE INVENTION

According to one aspect of the invention, a turbine cooling component comprising, a circumferential leading edge, a circumferential trailing edge spaced from the leading edge, a first side panel connected to the leading and trailing edges, a second side panel connected to the leading and trailing edges, spaced and opposed to the first side panel, an arcuate base connected to the trailing ledge and the leading edge having a fore portion, a midsection portion, an aft portion, an opposed first side portion and second side portion, an outer surface partially defining a cavity operative to receive pressurized air, and an arcuate inner surface in contact with a gas flow path of a turbine engine moving in the direction from the leading edge to the trailing edge of the turbine component, a first side cooling air passage in the base extending along the first side portion from the fore portion to the aft portion, and a fore cooling air passage in the fore portion of the base communicative with the side cooling air passage and the cavity, operative to receive the pressurized air from the cavity.

According to another aspect of the invention, a method for manufacturing a turbine cooling component comprising, forming a first side cooling air passage in a base of a shroud segment having a circumferential leading edge, a circumferential trailing edge spaced from the leading edge, wherein the first side cooling air passage extends through the circumferential leading edge and the circumferential trailing edge, and forming a fore cooling air passage communicative with the first side cooling air passage, extending through a first side panel of the shroud segment connected to the leading and trailing edges and a second side panel connected to the leading and trailing edges, spaced and opposed to the first side panel.

According to yet another aspect of the invention, a method for forming a cooling air passage in a component comprising, forming a first portion of an air passage having a first inner diameter in the component with a probe, forming a second portion of the air passage having the first inner diameter in the component communicative with the first portion of the air passage with the probe, and varying a rate of travel of the probe such that the probe increases the inner diameter of the second portion of the air passage to a second inner diameter.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 is a top cut away view of a portion of an exemplary profiled inner surface of a passage.

FIG. 8 is a top cut away view of a portion of an exemplary method of forming the profiled inner surface of the passage of FIG. 7.

The detailed description explains embodiments of the invention, together with advantages and features, by way of example with reference to the drawings.

DETAILED DESCRIPTION OF THE INVENTION

Figure 1:
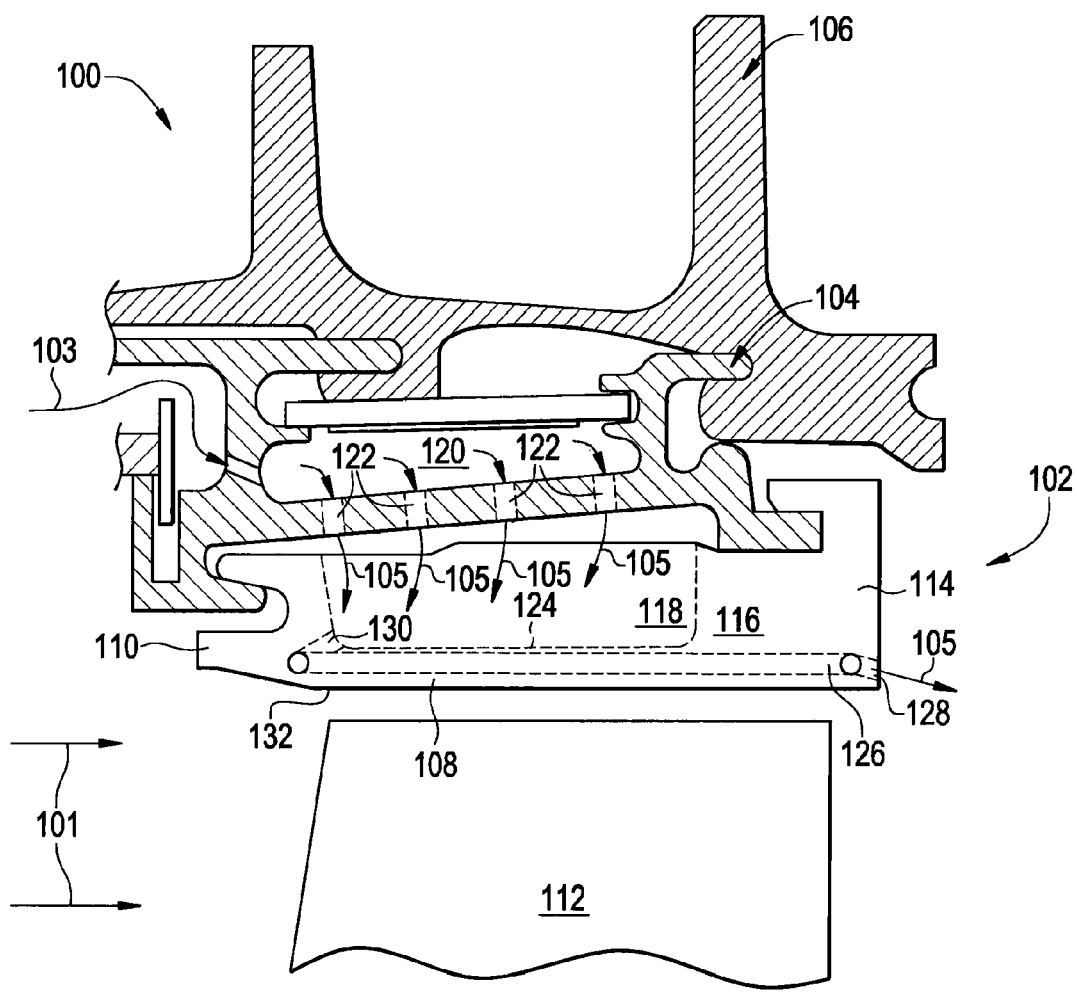
FIG. 1 is a side partially-cutaway view of a turbine cooling subassembly in the form of a shroud assembly.

FIG. 1 illustrates a side partially-cutaway view of a turbine cooling subassembly in the form of a shroud assembly generally indicated at 100 disposed in a surrounding relation with turbine blades 112. The turbine blades 112 are connected to a rotor (not shown) in a high pressure turbine section of a turbine engine. The gas flow path is shown in the direction of the arrows 101. The shroud cooling assembly 100 includes a shroud having an annular array of arcuate shroud segments. A shroud segment is shown generally at 102. The shroud segments 102 are held in position by an annular array of arcuate hanger sections. A hanger section is shown generally at 104. The hanger sections 104 are supported by an engine outer case shown generally at 106.

The shroud segment 102 includes a base 108, a fore rail 110 radially and forwardly extending from the base 108 that defines a circumferential leading edge of the shroud segment 102, an aft rail 114 that defines a circumferential trailing edge of the shroud segment 102, and angularly spaced side rails 116 radially outwardly extending from the base 108. The base 108 partially defines a shroud segment cavity 118.

In operation, pressurized air 103 from, for example, the compressor section of the turbine engine enters an upper plenum cavity 120 defined by the hanger section 104, and enters the shroud segment cavity 118 via holes 122 in the hanger section 104. The pressurized air 103 in the shroud segment cavity 118 impinges on a radially outer surface 124 of the base 108. Impingement air 105 cools the base 108, and enters entrance holes 130 of passages 126 that extend from the outer surface 124 of the base 108 into the base 108 to provide convection cooling of the shroud segment 102. The impingement air 105 exits the passages 126 via exit holes 128 located in the aft rail 114 of the shroud segment 102. Once the impingement air 105 has exited the exit holes 128, the impingement air 105 enters the gas flow path shown by the arrow 101.

Figure 2:
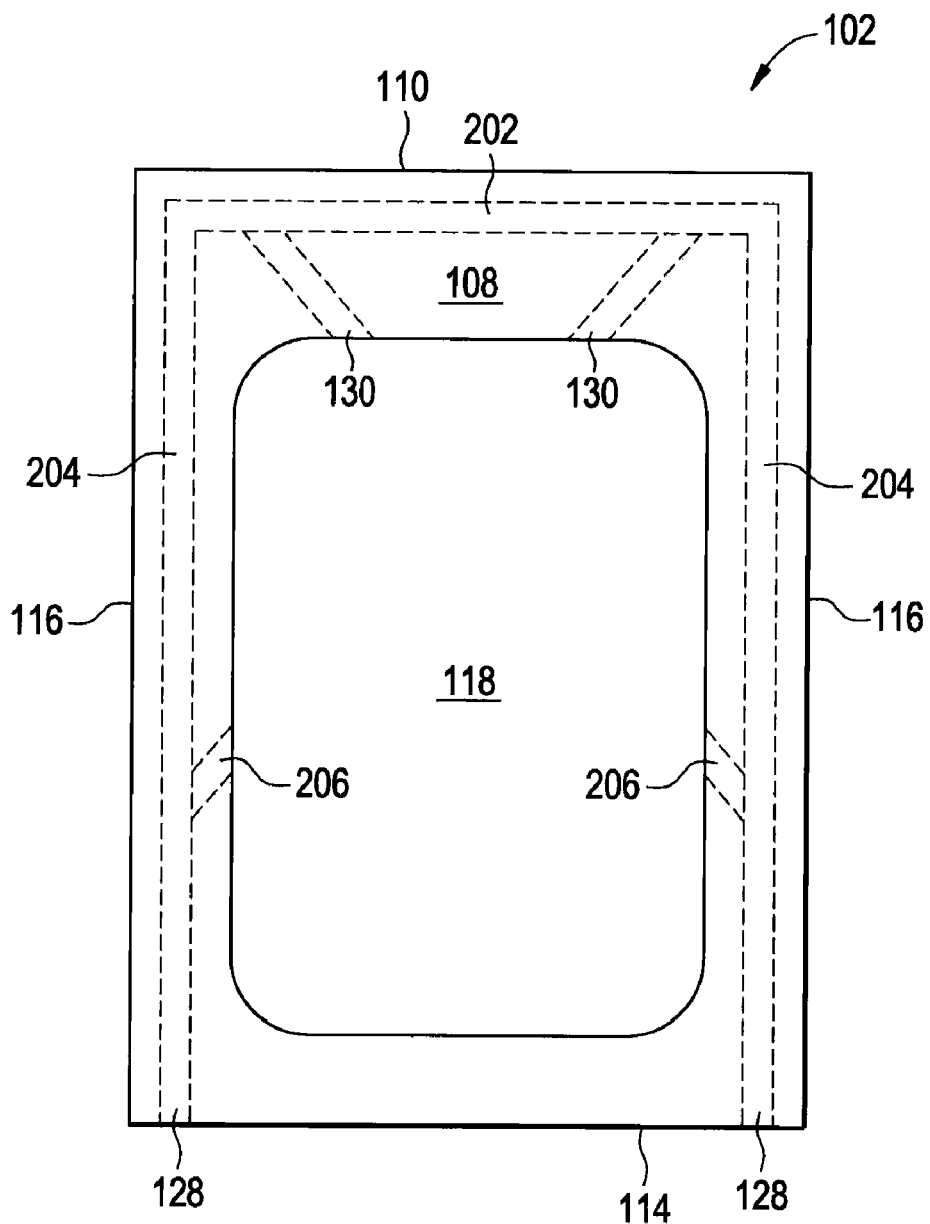
FIG. 2 is at top partially cut away view of an exemplary embodiment of the shroud segment of FIG. 1.

FIG. 2 illustrates at top partially cut away view of an exemplary embodiment of the shroud segment 102. The shroud segment 102 includes a fore passage 202 communicative with the shroud segment cavity 118 via the entrance holes 130. The fore passage 202 is communicative with side passages 204 that include the exit holes 128. In operation, impingement air 105 (of FIG. 1) enters the entrance holes 130 and flows through the fore passage 202 and the side passages 204, and exits into the gas flow path via the exit holes 128. The illustrated embodiment includes supplemental pressure holes 206 that may be included to provide additional impingement air 105 to the side passages 204. The supplemental pressure holes 206 compensate for a loss of impingement air 105 pressure in regions of the side passages 204 that are remote from the entrance holes 130.

The location of the fore passage 202 and the side passages 204 increases convection cooling in the fore rail 110 and the side rail 116 regions of the shroud segment 102. The fore rail 110 and the side rail 116 regions of the shroud segment 102 have been shown through experimentation to become relatively hotter than regions of the base 108 that are below to the shroud segment cavity 118 and are cooled by impingement air 105 that collects and cools the shroud segment cavity 118.

Previous embodiments of shroud segments have included vent holes disposed along the side rails 116, fore rail 110, and aft rail 114 that receive impingement air 105 from the shroud segment cavity 118 and port the impingement air 105 along outer surfaces of the shroud segment cavity 118 into the gas flow path. The illustrated embodiment of FIG. 2 uses the fore passage 202 and side passages 204 to cool the fore rail 114 and side rail 116 regions and may not include such vent holes. One advantage of omitting the vent holes is that the shroud segment 102 may include a thermal coating along the radially inner surface 132 (of FIG. 1). In production, the coating may be applied after the vent holes are fabricated (cast or drilled into the shroud segment 102), or applied before the vent holes are fabricated. If the coating is applied after the vent holes are fabricated, the vent holes are covered to prevent the coating from fouling the vent holes. If the coating is applied before fabricating the vent holes, the coating is removed from the area of the vent holes prior to fabrication. Either of these production methods increases the production costs of the shroud segment 102.

The increased cooling in the fore rail 114 and the side rail 116 provided by the location of the fore passage 202 and the side passages 204 may provide an opportunity to omit vent holes from the design of the shroud segment 102, reducing production costs. Other benefits may include reducing the amount of impingement air 105 that exits the shroud segment 102. The exiting impingement air 105 is often undesirable because the exiting impingement air 105 enters the high pressure section of the turbine engine and may negatively affect the gas flow path, thereby reducing the efficiency of the engine. The impingement air 105 is often ported from the air compressed in the compression section of the turbine engine (bleed air). Bleed air used for cooling is not used for combustion; thus reducing the bleed air used for cooling increases the efficiency of the turbine engine.

The illustrated embodiment of FIG. 2 is not limited to include two entrance holes 103 and exit holes 128, but may include any number of entrance holes 130 and exit holes 128, including a single entrance hole 130 or a plurality of entrance holes 130, and a single exit hole 128 or a plurality of exit holes 128.

Figure 3:
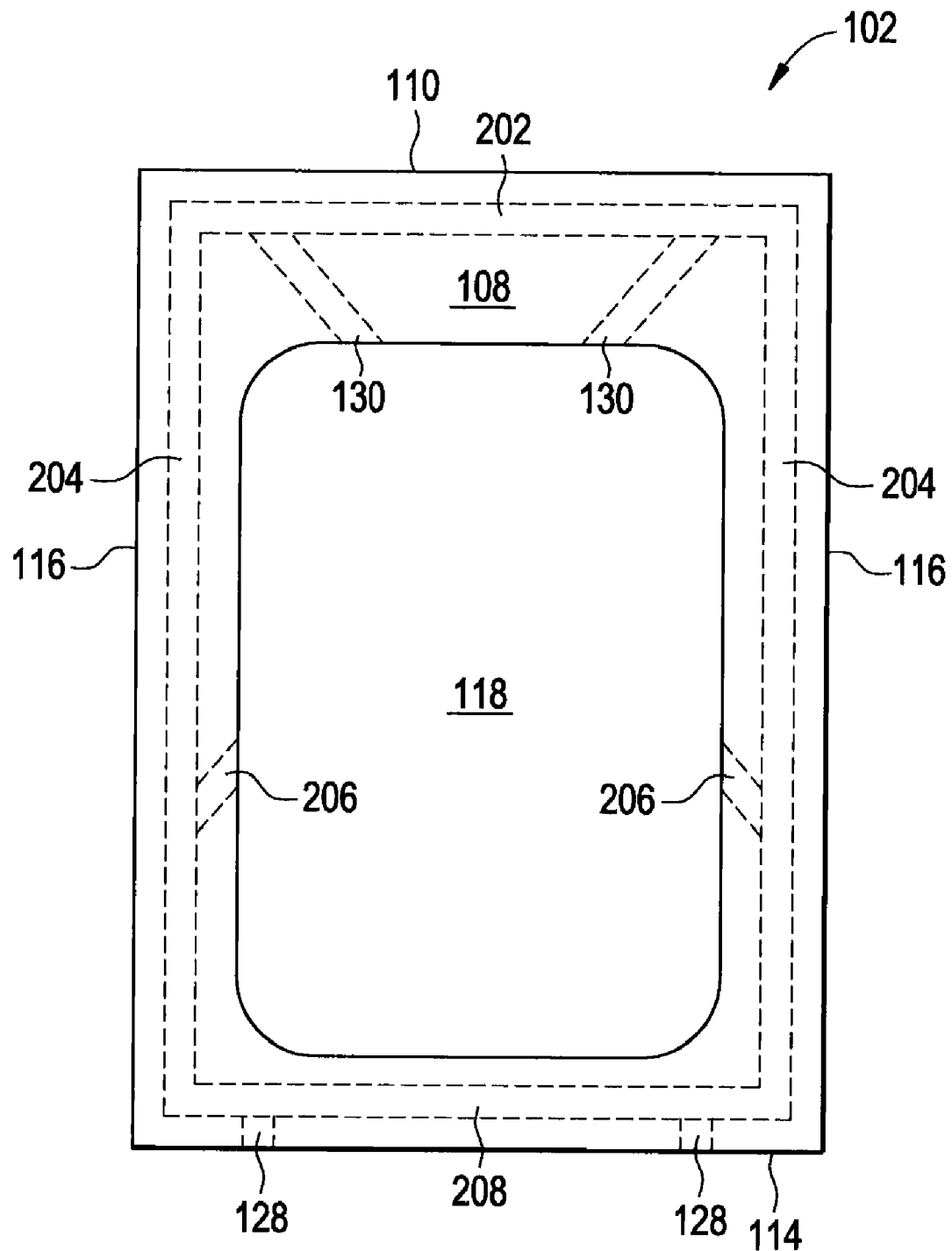
FIG. 3 is at top partially cut away view of an alternate exemplary embodiment of the shroud segment of FIG. 1.

FIG. 3 illustrates an alternate exemplary embodiment of the shroud segment 102. The shroud segment 102 in FIG. 3 is similar to the shroud segment 102 of FIG. 2 and includes an aft passage 208 communicative with the side passages 204. The aft passage 208 routs impingement air 105 for convection cooling of the aft rail 114 region of the shroud segment 102.

Figure 4:
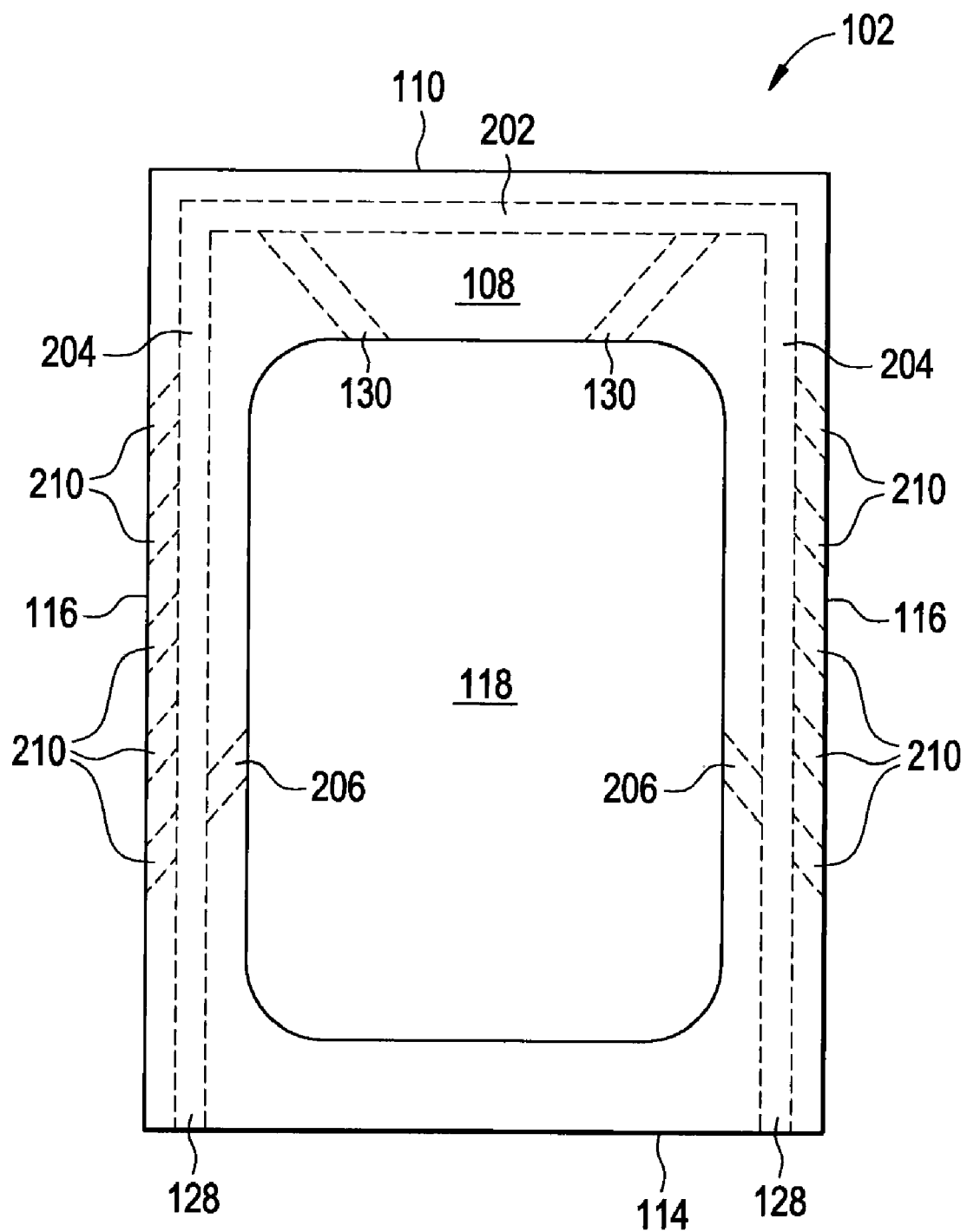
FIG. 4 is at top partially cut away view of another alternate exemplary embodiment of the shroud segment of FIG. 1.

FIG. 4 illustrates another alternate exemplary embodiment of the shroud segment 102. The shroud segment 102 in FIG. 4 is similar to the shroud segment 102 of FIG. 2 and includes a plurality of vent holes 210 communicative with the side passages 204 and the outer surface of the side rails 116. The vent holes 210 may be used to increase the cooling of the outer surface of the side rails 116, though the vent holes 210 may increase production costs.

Figure 5:
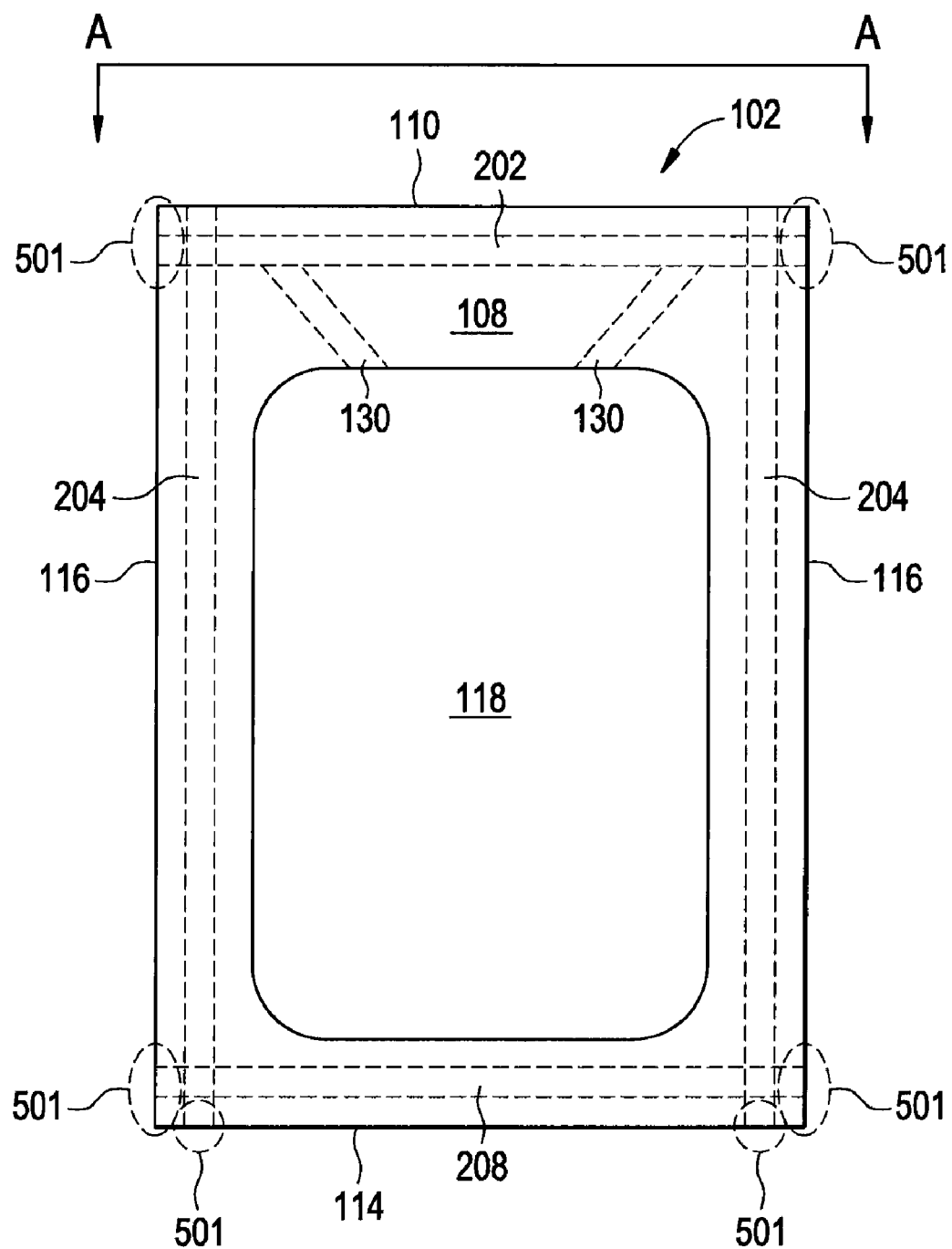
FIG. 5 is at top partially cut away view of an exemplary method for manufacturing the shroud segment of FIG. 1.

FIG. 5 illustrates at top partially cut away view of an exemplary method for manufacturing the shroud segment 102. The fore passage 202, the side passages 204, and the aft passage 208 have been formed through the outer surfaces of the fore rail 110, the side rails 116, and the aft rail 114. Once the passages have been drilled the undesirable drill holes may be sealed in the regions 501. The forming of the passages may be performed using a variety of techniques including, for example, drilling, electrical discharge machining (EDM), and electro chemical machining (ECM).

Figure 6:
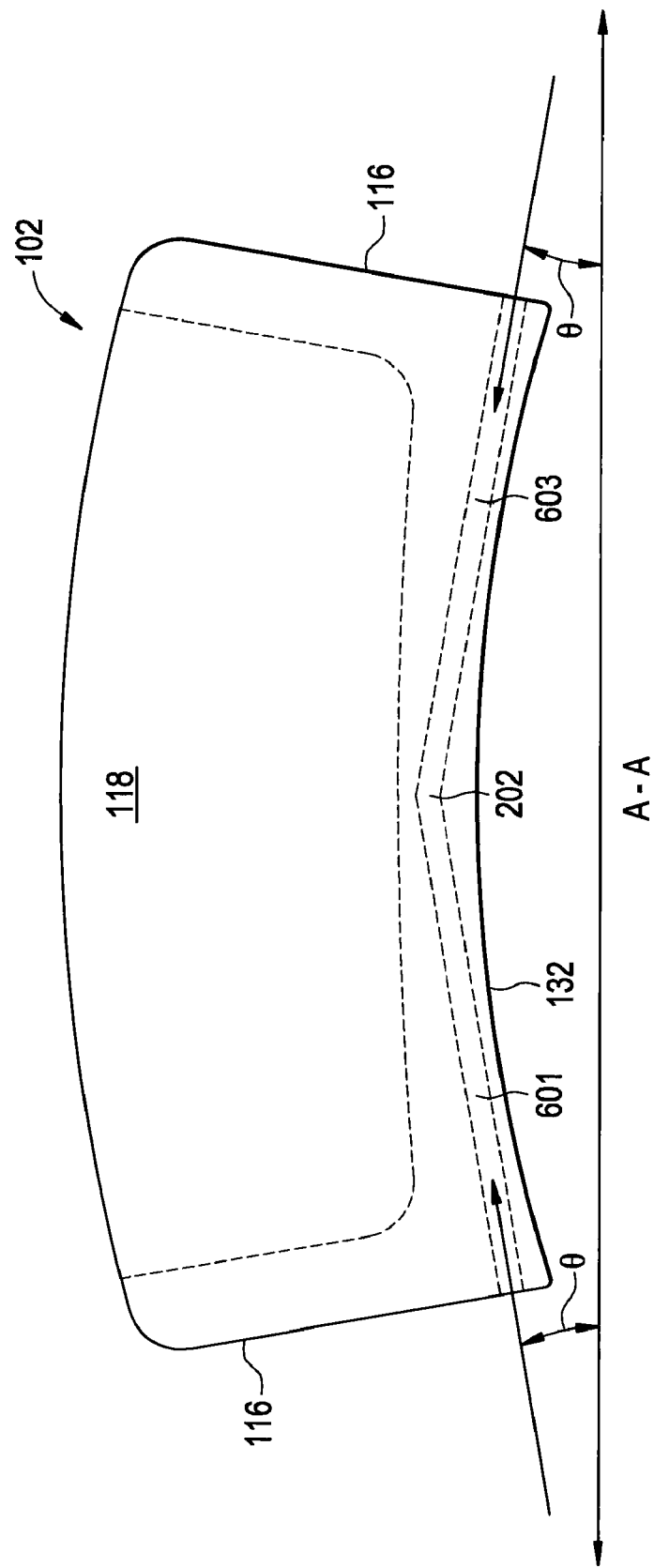
FIG. 6 is at front partially cut away view along the line A-A of FIG. 5.

FIG. 6 illustrates at front partially cut away view along the line A-A (of FIG. 5) of an exemplary method for manufacturing the shroud segment 102. The radially inner surface 132 of the shroud segment 102 includes an annular profile. The annular profile may make drilling the fore passage 202 difficult. The drilling of the fore passage 202 may be more easily performed by drilling the fore passage 202 from each side rail 116 at an angle theta. For example, the drilling procedure may include drilling a first passage 601 from one of the side rails 116 at an angle theta to a mid point of the shroud segment 102. A second passage 603 may then be drilled from the opposite side rail 116 at a similar angle with a drill depth that may intersect the first passage 601 approximately at the mid point of the shroud segment 102. Alternate embodiments may include a first passage 601 and a second passage 603 that do not intersect. The drilling of the fore passage 202 at angles using from opposite side rails 116 accommodates the annular profile. The aft passage 208 (of FIG. 5) may be drilled in a similar manner. The side passages 204 may be drilled in one drilling procedure if desired and will intersect portions of the fore passage 202 and the aft passage 208. Once the passages have been drilled, the portions of the passages that translate through the outer surfaces of the shroud segment may be sealed. The desired entrance holes 130 and exit holes 128 may be drilled in subsequent processes. Though the methods for fabricating the passages described above include drilling, the passages in the shroud segment 102 may be fabricated using other methods including, for example, casting processes.

An advantage of using a (EDM/ECM) processes for fabricating the passages described above is that the drilling process may be used to create a profiled inner surface of the passages. FIG. 7 illustrates a top, cut away view of a portion of an exemplary profiled inner surface of a passage. The profiled inner surface of the passage may be included as a feature of any of the passages described above, including the fore passage 202, the aft passage 208, and the side passage 204. Referring to FIG. 7, a passage 701 includes ridges 705 that decrease the inner diameter of the passage 701. The ridges 705 may improve the convective cooling of the impingement air 105 that flows in the passage 701, by disrupting the flow of the impingement air 105 (of FIG. 1). A desirable effect of the ridges 705 may include creating vortices in the flow of the impingement air 105 that increase the convective cooling effects of the impingement air 105.

FIG. 8 illustrates an exemplary method for forming the ridges 705. A EDM probe 801 is used to drill the passage 701. While drilling, the probe 801 rotates, and is driven forward in the direction of the arrow 805 into the material 807 to drill the passage 701. To form the ridges 705, the forward drive of the probe 801 pauses momentarily while the probe 801 continues material removal in the region 803 increasing the inner diameter of the passage 701 in the region 803. Pausing the forward drive of the probe 801 along portions of the passage 701 forms the ridges 705.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbine cooling component comprising:
   a circumferential leading edge;
   a circumferential trailing edge spaced from the leading edge;
   a first side panel connected to the leading and trailing edges;
   a second side panel connected to the leading and trailing edges, spaced and opposed to the first side panel;
   an arcuate base connected to the trailing ledge and the leading edge having a fore portion, a midsection portion, an aft portion, an opposed first side portion and second side portion, an outer surface partially defining a cavity operative to receive pressurized air, and an arcuate inner surface in contact with a gas flow path of a turbine engine moving in the direction from the leading edge to the trailing edge of the turbine component;
   a first side cooling air passage in the base extending along the first side portion from the fore portion to the aft portion, wherein the first side cooling air passage has an inner surface including a ridge operative to effect a flow of the pressurized air; and
   a fore cooling air passage in the fore portion of the base communicative with the side cooling air passage and the cavity, operative to receive the pressurized air from the cavity.

2. The component of claim 1, wherein the component further comprises a first outlet communicative with the first side cooling air passage and the trailing edge operative to emit the pressurized air into the gas flow path.

3. The component of claim 1, wherein the component further comprises a second side cooling air passage in the base extending along the second side portion from the fore portion to the aft portion.

4. The component of claim 3, wherein the second side cooling air passage includes an inlet communicative with the cavity operative to receive pressurized air.

5. The component of claim 3, wherein the second side cooling air passage has an inner surface including a ridge operative to effect a flow of the pressurized air.

6. The component of claim 1, wherein the second side cooling air passage is communicative with the fore cooling air passage.

7. The component of claim 1, wherein the component further comprises:
   an aft cooling air passage in the aft portion of the base communicative with the side cooling air passage and the cavity; and
   a second outlet communicative with the aft cooling air passage and the trailing edge operative to emit the pressurized air into the gas flow path.

8. The component of claim 7, wherein the component further comprises a second side cooling air passage in the base extending along the second side portion from the fore portion to the aft portion, communicative with the fore cooling air passage and the aft cooling air passage.

9. The component of claim 7, wherein the aft cooling air passage has an inner surface including a ridge operative to effect a flow of the pressurized air.

10. The component of claim 1, wherein the first side cooling air passage includes an inlet communicative with the cavity operative to receive pressurized air.

11. The component of claim 1, wherein the ridge included in the first side cooling air passage inner surface is one of a plurality of ridges included in the inner surface of the first side cooling air passage.

12. The component of claim 1, wherein the fore cooling air passage has an inner surface including a ridge operative to effect a flow of the pressurized air.

13. A method for manufacturing a turbine cooling component comprising:
   forming a first side cooling air passage, with ridges in an inner surface of the first side cooling air passage, in a base of a shroud segment having a circumferential leading edge, a circumferential trailing edge spaced from the leading edge, wherein the first side cooling air passage extends through the circumferential leading edge and the circumferential trailing edge; and
   forming a fore cooling air passage communicative with the first side cooling air passage, extending through a first side panel of the shroud segment connected to the leading and trailing edges and a second side panel connected to the leading and trailing edges, spaced and opposed to the first side panel.

14. The method of claim 13, wherein the method further comprises forming a second side cooling air passage in a base of a shroud segment, wherein the second side cooling air passage extends through the circumferential leading edge and the circumferential trailing edge and is communicative with the fore cooling air passage.

15. The method of claim 14, wherein the method further comprises forming an aft cooling air passage in a base of the shroud segment, communicative with the first side cooling air passage and the second cooling air passage, extending through a first side panel of the shroud segment connected to the leading and trailing edges and a second side panel connected to the leading and trailing edges, spaced and opposed to the first side panel.

16. The method of claim 13, wherein the method further comprises forming an aft cooling air passage in a base of the shroud segment, communicative with the first side cooling air passage, extending through a first side panel of the shroud segment connected to the leading and trailing edges and a second side panel connected to the leading and trailing edges, spaced and opposed to the first side panel.

17. The method of claim 13, wherein method further comprises forming ridges in an inner surface of the fore cooling air passage.

18. The method of claim 13, wherein the method further comprises sealing portions of the first side cooling air passage.

19. A method for forming a cooling air passage in a component comprising:
 forming a first portion of an air passage having a first inner diameter in the component with a probe;
 forming a second portion of the air passage having the first inner diameter in the component communicative with the first portion of the air passage with the probe; and
 varying a rate of travel of the probe such that the probe increases the inner diameter of the second portion of the air passage to a second inner diameter.

\* \* \* \* \*